(12) United States Patent
Deans

(10) Patent No.: US 9,188,262 B2
(45) Date of Patent: Nov. 17, 2015

(54) HIGH PRESSURE PIPE JOINT

(75) Inventor: Allan Bushell Deans, Oxley (AU)

(73) Assignee: Steel Mains Pty Ltd, Somerton (AU)

( * ) Notice: Subject to any disclaimer, the term of this patent is extended or adjusted under 35 U.S.C. 154(b) by 221 days.

(21) Appl. No.: 13/814,486

(22) PCT Filed: Aug. 3, 2011

(86) PCT No.: PCT/AU2011/000973
§ 371 (c)(1),
(2), (4) Date: Apr. 11, 2013

(87) PCT Pub. No.: WO2012/016277
PCT Pub. Date: Feb. 9, 2012

(65) Prior Publication Data
US 2013/0214530 A1    Aug. 22, 2013

(30) Foreign Application Priority Data
Aug. 6, 2010   (AU) ................. 2010903531

(51) Int. Cl.
*F16L 13/02*    (2006.01)
*F16L 19/075*   (2006.01)
*F16L 21/035*   (2006.01)

(52) U.S. Cl.
CPC ........... *F16L 19/075* (2013.01); *F16L 13/0236* (2013.01); *F16L 13/0272* (2013.01); *F16L 21/035* (2013.01)

(58) Field of Classification Search
USPC ............... 285/95, 288.1, 288.2, 288.3, 288.4, 285/335, 345, 347, 45
See application file for complete search history.

(56) References Cited

U.S. PATENT DOCUMENTS

| 1,750,010 A | * | 3/1930 | King ............................. 228/154 |
| 1,816,770 A | * | 7/1931 | Gradl ............................ 285/229 |
| 1,834,102 A | * | 12/1931 | McCalley ................. 285/148.8 |
| 2,273,154 A | * | 2/1942 | Stromsoe ....................... 285/55 |
| 2,324,928 A | * | 7/1943 | Hill ............................... 285/55 |
| 2,461,100 A | * | 2/1949 | White ..................... 285/148.22 |
| 3,503,631 A | * | 3/1970 | Greever ..................... 285/21.1 |
| 3,528,688 A | * | 9/1970 | Stenerson ................. 285/288.1 |
| 4,583,772 A | * | 4/1986 | Vassallo et al. ............... 285/347 |
| 6,457,718 B1 | | 10/2002 | Quesada |
| 7,537,248 B2 | | 5/2009 | Jones et al. |
| 7,641,241 B2 | | 1/2010 | Mieszelewicz |
| 2006/0232066 A1 | * | 10/2006 | Kanagae et al. ............. 285/348 |

FOREIGN PATENT DOCUMENTS

| CN | 1163366 A | 10/1997 |
| CN | 101059187 A | 10/2007 |
| CN | 201180876 Y | 1/2009 |
| GB | 2129897 A | 5/1984 |

* cited by examiner

*Primary Examiner* — Aaron Dunwoody
(74) *Attorney, Agent, or Firm* — Quarles & Brady LLP

(57) ABSTRACT

A pipe joint between two metallic pipes which have been internally and/or externally coated with a material to prevent corrosion. The pipe joint includes a spigot terminating in an inverted hump supporting an elastomeric seal wherein the inverted hump is spaced from a protruding hump. The pipe joint further includes a socket adapted to fit over the spigot, the socket having an outwardly flared forward end terminating in an annular lip that engages an exterior of the protruding hump wherein the lip is welded to an exterior of the spigot.

8 Claims, 3 Drawing Sheets

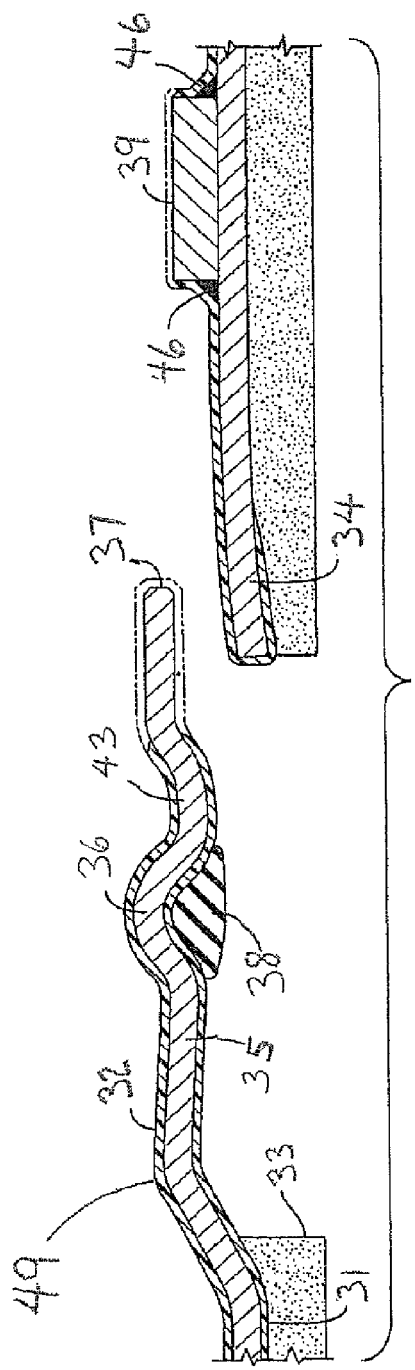
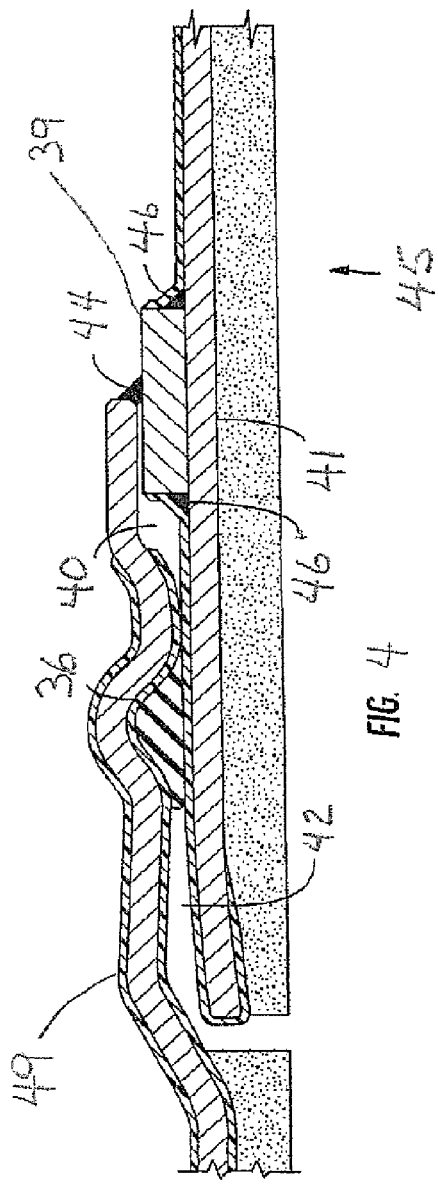

HIGH PRESSURE PIPE JOINT

FIELD OF THE INVENTION

The present invention relates to pipe joints, and more particularly, to a pipe joint which includes a spigot terminating in an inverted hump for supporting an elastomeric seal wherein the inverted hump is spaced from a protruding hump and a socket having an outwardly flared forward end terminating in an annular lip that engages an exterior of the protruding hump wherein the lip is welded to an exterior of the spigot

BACKGROUND OF THE INVENTION

Pipe joints incorporating elastomeric rings have been in common use on pipeline systems. They provide a cost effective method of joining pipes and have been generally proven to be very reliable in service. By themselves, however, they do not provide end restraint, which is to say that they will not prevent the joints between pipes from coming separated if the lie of the pipeline could lead to this possibility. This situation is possible where the pipeline direction changes and no other steps are taken to account for the pressure thrust so generated.

With previous joints attempts to weld plastic coated and lined pipes, and thereby to provide the necessary restraint, has resulted in the heat being conducted through the steel on the spigot causing damage to the internal lining. Additionally with these joints heat was conducted along the lip of the socket and into the area where the elastomeric ring resides. This heat then softens the internal coating of the socket which causes the elastomeric material of the rings to expand radially and the compression force of the ring between the internal surface of the socket and the external surface of the spigot diminishes. This loss of compression enables water to leak past the elastomeric sealing ring and into the welded joint area where corrosion can take place.

Another method of joining pipes that does provide full restraint is an externally welded lap weld. This method is only applicable when the lining material is cement mortar. A drawback with this method is that there is always an exposed steel section inside the pipe that can corrode when exposed to certain water chemistry. This method is also not applicable when the lining is of a plastic or other similar type coating.

SUMMARY OF THE INVENTION

According to one aspect of the present invention there is provided a pipe joint between two metallic pipes which have been internally and/or externally coated with a material to prevent corrosion, the joint including a socket adapted to fit over a spigot, the socket having an outwardly flared forward end terminating in an annular lip, the spigot terminating in an inverted hump supporting an elastomeric seal, the inverted hump being spaced from a protruding hump, the coating being removed from the forward end of the socket and protruding hump of the spigot whereby the socket is pushed onto the end of the spigot until the annular lip engages the exterior of the protruding hump, the lip being welded to the exterior of the spigot and a protective corrosion resistant coating applied to the exterior of the weld at the join between the lip of the socket and adjacent exterior of the spigot.

BRIEF DESCRIPTION OF THE DRAWINGS

FIG. 3 is a cross-sectional view of one side of the joint prior to assembly in accordance with an alternate embodiment of the invention.

FIG. 4 is a cross-sectional view of the joint shown in FIG. 3 after assembly.

DESCRIPTION OF THE INVENTION

Figure 1:
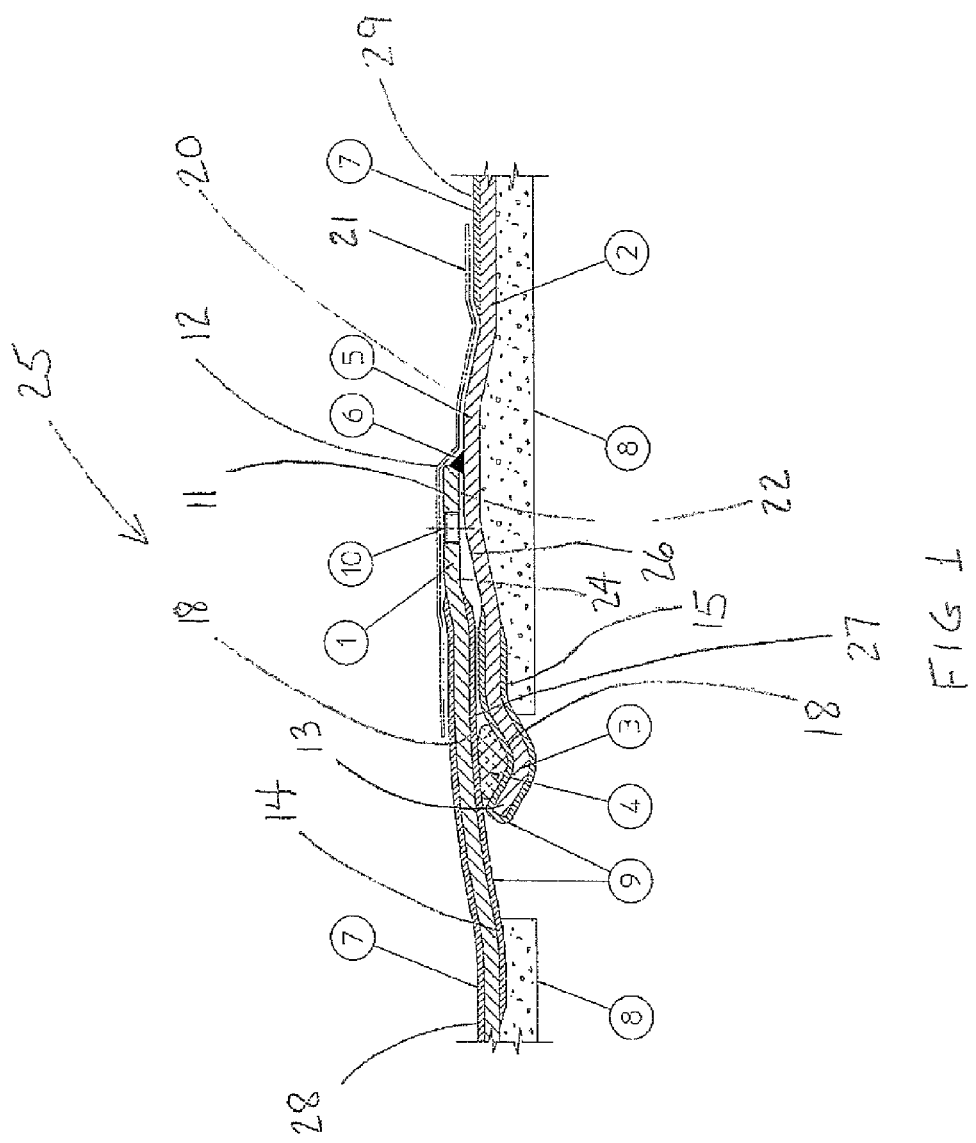
FIG. 1 is a cross sectional view of one side of an assembled pipe joint in accordance with an embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings. In the description below, like reference numerals and labels are used to describe the same, similar or corresponding parts in the several views of FIGS. 1-4.

Referring to FIG. 1, a cross sectional view of one side of an assembled pipe joint 25 in accordance with a preferred embodiment of the invention is shown. The pipe joint 25 illustrated in FIG. 1 is used for joining first 28 and second 29 metal pipes end to end. The first pipe 28 terminates in a socket 1 that is arranged to fit over a spigot 2 formed at an end of the second pipe 29. Both the socket 1 and spigot 2 are formed of rolled steel. The socket 1 is expanded outwardly to form an outwardly flared socket forward end 11 that terminates in an annular lip 12. The spigot 2 is rolled with an inverted hump 3 adjacent a spigot forward end 13. Inverted hump 3 is adapted to accommodate an elastomeric annular seal 4. The spigot 2 is also rolled outwardly downstream of the inverted hump 3 to define a protruding hump 5. An outside diameter 20 of the protruding hump 5 is not the same as an internal diameter 22 of the annular lip 12 on the socket 1 to enable a clearance fit.

Both the socket 11 and spigot 13 forward ends of the socket 1 and spigot 2 are coated with fusion bonded polyethylene 9. Downstream of the socket 11 and spigot 13 forward ends there is a conventional cement mortar lining 8 that overlaps edges 14 and 15 of the bonded polyethylene 9. The bonded polyethylene 9 is removed from the socket forward end 11 or lip 12 of the socket 1 and only extends a short distance rearwardly of the spigot 2. In this manner when the socket 1 is placed on the spigot 2 with the lip 12 in a butting contact with the protruding hump 5, an adjacent internal surface 24 of the socket 1 and an external surface 26 of the spigot 2 are not covered with the polyethylene coating 9. However, internal surfaces 18 of both the socket 1 and the spigot 2 at the join between the two, that is in the area adjacent the elastomeric seal 4, are fully coated by the polyethylene which means that there is no need for further internal coating to protect the jointed assembly.

The socket 1 is driven over the seal 4 with the lip 12 of the socket 1 being clear of the seal 4 and the seal 4 being progressively compressed by an internal taper 27 of the socket 1.

When the lip 12 of the socket 1 engages a peak of the protruding hump 5, the socket 1 can be welded to the spigot 2 using an appropriate fillet weld 6. A threaded test hole 10 is provided in the socket 1 to enable an air test of the joint after assembly, enabling the pipeline installer to verify joint sealing during pipeline construction. After testing, a grub screw is inserted into the hole 10 and a seal welded on top.

Figure 2:
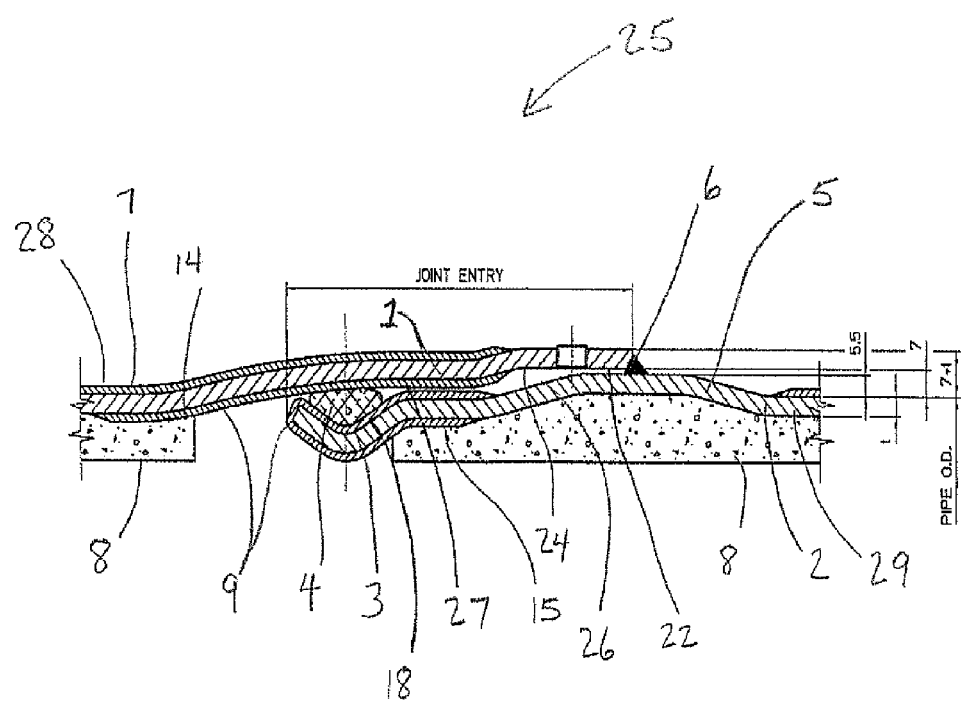
FIG. 2 is a view of an exemplary spigot hump geometry for the joint shown in FIG. 1.

Referring to FIG. 2, an exemplary spigot hump geometry for the joint 25 is shown.

The hump OD and the gap between socket lip and spigot hump are important for joint fatigue life. Joint geometry around the spigot hump, for all pipe sizes, is:

Spigot hump OD is 5.5 mm radially larger than nominal pipe OD
Nominal socket lip to spigot hump gap is 1.5 mm
Maximum allowed joint deflections is 1.1° for all joint sizes
Socket and spigot are welded with a fillet weld equal to the plate thickness, and a weld prep.

Joint entry varies between 100 mm (for 508 mm pipe OD) and 140 mm (for 1829 mm pipe OD).

Once the welding is complete the area adjacent the weld 6 both up stream and down stream of the spigot 2 and socket 1 is externally coated with a tape wrap or shrink sleeve 21.

The joint is designed to minimise bending stresses when the joint is subjected to axial forces resulting from hydraulic thrust reactions at nearby closed pipe sections or pipe bends.

The method of this preferred embodiment includes the following steps:

a. Expansion of the socket end to a predetermined size using specially shaped dies and profiling the lip area (11) to enable it to overlap the spigot (2).

Formation of the spigot by:

b. Groove rolling the inverted hump 3 for the elastomeric seal 4 and formation of the protruding hump 5, by rolling outwardly or cold forming in a set of rotary dies, downstream of the inverted hump 3.

c. Blasting the external surface of the pipe to a minimum of Class 2½ finish.

d. Blasting the internal surface near the ends (or full length where required) to a minimum of Class 2½ finish.

e. Heating the pipe body to a preferred temperature with the pipe body near the ends heated to a second (higher) preferred temperature.

f. Immersing the hot rotating pipe in a fluidized bed of coating powder with the immersion process being controlled by a time/temperature function.

g. Placing the coated pipe on cooling racks to allow the complete melt through of the coating and subsequent cooling by natural or fan assisted airflow.

h. Where the internal coating (lining) is not continuous along the full length of the pipe and another material is being overlaid i.e. cement mortar lining, the termination of the plastic coating is beveled down to the steel surface using a beveling machine.

i. Reinstatement of holding or support areas.

j. Application of other overlapping lining material (where applicable).

Also in accordance with the preferred embodiment of the present invention an internally corrosion resistant sealed pipe joint 25 is provided that, by externally welding, involves the following basic steps:

a. Cold expansion of the pipe socket followed by rotary profiling and sizing of the extended pipe lip.

b. Grit blasting the inner and outer surfaces of the pipe.

c. Heating the pipe.

d. Applying a protective layer to the inner and outer surfaces of the pipe.

e. Allowing the pipe to cool.

f. Application of a cement mortar lining (where applicable).

All parts of the method of this preferred embodiment are completed off site with the exception of the final preparation for the joining method, which is done by the following steps:

a. Fitting of an elastomeric seal to the spigot groove.

b. Application of lubricant to the surface of the spigot.

c. Pushing the spigot into the socket to the required position.

d. Welding the extended lip to the spigot (2) (weld 6).

e. Overlaying the exposed steel surface with a heat shrink sleeve 21.

Therefore, the joint 25 is comprised of an expanded steel socket 1 that fits over a steel spigot 2 having a rolled inverted hump 3 that captures an elastomeric seal 4 and a rolled protruding hump 5 that provides a mating surface upon which the fillet weld 6 is applied at the end of the socket 1.

Externally, the steel is protected from corrosion by a coating of fusion bonded polyethylene 7. The coating 7 terminates on either side of the weld location, and after welding is complete the exposed steel is completely covered by a tape wrap or shrink sleeve protection product 21.

Internally, the steel is protected by cement mortar lining 8. The lining 8 terminates before the ends of the socket 1 and spigot 2 and the steel in this area is protected from corrosion by a coating of fusion bonded polyethylene 9, which extends under the cement mortar 8 lining for a short distance.

The current invention provides a substantially full corrosion protected joint 25 without the requirement for man entry into the pipe to complete the joint assembly and corrosion protection procedures.

In addition, the joint 25 is suitable for high internal pressure application over lifetime of pipeline. The joint is designed to have a low profile expanded socket 1 and low profile protruding spigot hump 5, and these features minimise bending stresses in these sections when the joint 25 is subjected to axial forces resulting from hydraulic thrust reactions at nearby closed pipe sections or pipe bends. Where the pipeline is subjected to transient pressure fluctuations over the lifetime of the pipeline, large numbers of pressure fluctuations can result in stress fatigue in highly stressed sections and the low profile sections are designed to minimise this effect. Similarly, the size of the fillet weld 6 is designed to minimise the risk of fatigue failure at this location.

Compression of the elastomeric seal 4 on assembly and the application of the fillet weld 6 in conjunction with the low profile features described provide a pressure retaining capability for the joint 25 that is suitable for high pressure water pipe applications.

The current invention enables angular deflection of the joint on assembly. The design allows for the fillet weld 6 to be applied at the end of the socket 1 along a section of the expanded hump on the spigot 5 such that the joint can be deflected over a limited range of angular deflection prior to welding the joint 25. This important feature gives the pipeline installer the ability to achieve small alignment deviations in the pipeline at each joint 25, which can in some instances eliminate the need for fabricated bends in the pipeline, and thus reduce laying cost.

Further, location of the inverted hump 3 in the spigot 2 instead of a socket reduces exposure of the inverted hump 3 to longitudinal, bending and fatigue stresses and enables increased operating pressure for the joint 25 thus increasing the pressure rating capability for the joint 25.

Referring to FIGS. 3 and 4, an alternate embodiment for a joint 45 is shown. FIG. 3 is a cross-sectional view of one side of the joint 45. FIG. 4 is a cross-sectional view of the joint shown in FIG. 3 after assembly. In the alternate embodiment, the joint 45 includes an expanded socket 49 with a rolled sealing groove 36 that has been coated to providing a seating for an elastomeric sealing ring 38. The area in front of the sealing groove 36 is called the lip 43. In order to provide the restraint, the lip 43 is extended and flared outwards to provide a suitable welding position 37 remote from the elastomeric sealing ring 38. The coating on the end of the socket lip 43 has been removed to facilitate welding. A mating spigot 34 has a heat sink member in the form of a band 39 attached to the outside to enable the lip 43 to be fillet welded at location 44 to the heat sink member 39 without causing a critical rise in temperature of the inside surface of the pipe 41.

When the spigot 34 is pushed into the socket 49 the elastomeric sealing ring 38 prevents internal fluid from entering the welded joint region 40. The socket lip 43 overlaps the heat sink member 39 and the member is of sufficient width to allow for the axial deflection of the pipes at the joint 45. When the joint 45 is completed by full circumference welding at location 44 the external exposed steel surface is corrosion protected by the use of a heat shrunk sleeve. The internal surfaces up to and under the elastomeric sealing ring 38 (around area 42) are coated with a thermoplastic material that provides a barrier coating against corrosion. This plastic material may be continued along the full length of the bore of the pipe or it may be terminated some 30 to 50 mm under a cement mortar lining. In so doing the steel surface is totally isolated from the fluid within the pipe joint 45 by the barrier coating and the cement mortar lining.

The method of the current embodiment includes the following steps:
 a. Expansion of the socket end 35 to a predetermined size using specially shaped dies.
 b. Groove rolling the seat 36 for the elastomeric seal 38 and profiling the lip area (37/43) to enable it to overlap the heat sink member 39.
 c. Formation of the spigot 34 by either collapsing in a tapered die or cold bending in a set of rotary dies.
 d. Attachment of the heat sink member to the spigot using two continuous fillet welds 46.
 e. Blasting the external surface of the pipe to a minimum of Class 2½ finish.
 f. Blasting the internal surface near the ends (or full length where required) to a minimum of Class 2½ finish.
 g. Heating the pipe body to a preferred temperature with the pipe body near the ends heated to a second (higher) preferred temperature.
 h. Immersing the hot rotating pipe in a fluidized bed of coating powder with the immersion process being controlled by a time/temperature function.
 i. Placing the coated pipe on cooling racks to allow the complete melt through of the coating and subsequent cooling by natural or fan assisted airflow.
 j. Where the internal coating (lining) is not continuous along the full length of the pipe and another material is being overlaid i.e. cement mortar lining, the termination of the plastic coating is beveled down to the steel surface using a beveling machine.
 k. Reinstatement of holding or support areas.
 l. Application of other overlapping lining material (where applicable).

Also in accordance with the current embodiment an internally corrosion resistant sealed pipe joint is provided that, by externally welding, involves the following basic steps:

a. Cold expansion of the pipe socket followed by rotary profiling and sizing of the groove and extended pipe lip.
 b. Grit blasting the inner and outer surfaces of the pipe.
 c. Heating the pipe.
 d. Applying a protective layer to the inner and outer surfaces of the pipe.
 e. Allowing the pipe to cool.
 f. Application of a cement mortar lining (where applicable).

All parts of the method of current embodiment are completed off site with the exception of the final preparation for the joining method, which is done by the following steps:
 a. Removal of the plastic coating around the end of the pipe socket at location 37.
 b. Removal of the coating on the top of the heat sink member at location 39.
 c. Fitting of an elastomeric seal to the socket groove.
 d. Application of lubricant to the surface of the spigot.
 e. Pushing the spigot into the socket to the required position.
 f. Welding the extended lip to the heat sink member (weld 44).
 g. Overlaying the exposed steel surface with a heat shrink sleeve.

The important aspects of the current embodiment can be summarized as follows:
 a) The Extended Lip Area (from Location 43 to Location 37).

This is the area that overlaps the heat sink member on the spigot of the pipe and enables it to be fillet welded to the band. The inside diameter of this area should be controlled within tight limits. If this diameter is too small it will either not fit over the heat sink member or will not allow the required deflection of the joint. If it is too large the gap between the lip and the heat sink member will be too large to accommodate a fillet weld. This diameter is determined by control of the initial expansion and a combination of forming dies and coating techniques that maintain the relationship between it and the inside diameter of the lip (43, after coating) and the groove (6, after coating).

b) The Inside Diameter of the Lip 43 after Coating.

The finished inside diameter of the lip after coating is one of the important dimensions in the joint. In combination with the outside diameter of the particular spigot fitted to the socket 49 it determines the maximum gap that is possible in the joint. If this gap is too large the elastomeric ring seal can be extruded through the gap by the action of the internal fluid pressure. If there is no gap or interference then it may not be possible to make the joint. This diameter is controlled by a combination of the initial socket expansion, size and shape of the rolling dies and control of the coating parameters.

c) The Sealing Groove 36.

There are several key aspects involved the sealing groove, all of which should be controlled by the manufacturing process. Firstly the internal diameter after coating should be held within tight limits as this determines, in combination with the spigot 34, how much initial compression is exerted on the elastomeric (rubber) seal 38. Too much compression on the rubber seal may render the joint impossible to join. Too little compression and the seal may leak and not perform its required function. Secondly the shape of the groove is also important to the secure location of the seal. The coated groove must be shaped such that it matches the shape of the rubber seal to ensure that the rubber seal does not either rock or slide back and forward in the groove. Either situation can cause the elastomeric seal to be dislodged during assembly of the joint.

The finished size and shape of the groove are dies and careful control of the coating parameters.

d) The Outside Diameter of the Spigot 34 after Coating.

This diameter is also important to the performance of the elastomeric seal. This diameter is controlled during the pipe manufacturing process and by careful control of the coating parameters.

e) The Outside Diameter of the Heat Sink Member 39.

This dimension is important in determining the weld gap 44.

f) The Distance Between the Weld Gap Point 44 and the Socket Groove (36).

This distance is also important and was determined by extensive experimentation to be the minimum distance that heat during formation the weld 44 will not cause softening of the internal groove coating that would then lead to reduction in the compression of the elastomeric seal 38.

g) The Width and Thickness of the Heat Sink Member 39.

This member (band) absorbs and dissipates heat during formation of the weld 44, thereby preventing the temperature on the adjacent inside surface of the pipe 41 from rising to a level that would cause damage to the lining of the pipe. The width of the heat sink member must also take into account the axial location at the joint 45 caused by the deflection angle of the pipe.

The present invention therefore provides an improvement to prior art methods by adopting a number of steps that together result in a coating that is dimensionally consistent and provides improved joint integrity. The extended lip provided to complete the joining restraint introduces another level of complication into the control process and necessitates a major revision in the manufacturing process to enable all of the exacting tolerances to be met.

The polyethylene coating 32 extends around exterior of the socket end 35 and continues internally. The socket end 35 has its inner surface coated with the polyethylene coating 32 along its length and meets the cement mortar lining 33 which protects the remaining internal length of the pipe 31.

The methodology of the present invention seeks to improve the production of steel elastomeric jointed pipes as mentioned above.

Joint formation is effected in the following manner:

The pipe is produced initially with the spigot end of the body of the spigot and sized to mate the socket within ±0.5 mm, and limiting the diameter at a point, 120 mm from the end of the spigot. A reduction of the thickness of the pipe is introduced at the very end of the spigot to permit ease of entry into the socket during assembly.

Larger diameters of the socket will cause assembly difficulties in the field that could render the joint impossible to assemble. Lower diameters below nominal will reduce seal pre-compression which provides the initial seal, and eliminates external root penetration through the joint, provides circumferential rounding forces on the socket to reduce localized lip gaps to below the critical level of 2 mm, and therefore eliminates the chance of seal dislocation.

The diametric dimensions of the socket for each specific pipe size are designed taking into account the final outside diameter of the spigot and the thickness and tolerance of the corrosion protection coating. The rolled socket demands precise rolling die dimensions and settings to ensure reproducibility The socket diameter at a position just inward of the groove is controlled during the first expansion process to be 6 mm greater than that of the finished lip inside diameter. This allows for minor adjustments in the finished lip inside diameter to be made by minute adjustments to the initial expansion. The expansion is determined by register settings in a programmable controller with digital readout enabling adjustments as small as 0.1 mm in diameter. This vastly improves production process results in very little need for corrective action and simplifies the production demands on the operator. Any undersized products can simply be reprocessed as normal pipes. Oversized ends need to be scrapped.

Surface Preparation

The next step in the process is to prepare the pipe surface in order to enable application of the corrosion protection layer. Sound adhesion between the corrosion protection layer and the substrate is obtained principally due to "Anchor pattern" effects (a term well known in the art). Optimum pattern conditions are achieved by the use of steel grit abrasive conforming to 'running mixes" (also a term well known in the art) of the following graduation:

| μm | | | |
|---|---|---|---|
| Passing | | % | |
| 840 | 710 | 12.8 | 27.0 |
| 600 | 500 | 28.5 | 14.5 |
| 425 | 355 | 9.2 | 4.7 |
| 300 | | | 3.3 |

TAKEOUT SIZE 177

AS 1627 Part 4 Class 2.5-3 with profile height of 50-75 μm Rtm and 85-95 Rt.

The internal surfaces of the joint ends are prepared simultaneously with the external process by selective rotational/travel delays when the critical joint areas are located in the "Hot Spot" (also a term well known in the art) region of the blast machine. Both direct and reflective particle impingement maintains profile character in the socket region including the faces outside the direct line of the particle trajectory.

Where the entire internal surface of the pipe is to be coated (lined) with polyethylene the inside surface is also blasted in another blasting machine specifically designed for internal blasting, to produce a surface texture and state of cleanliness equivalent to the outside surface.

Heating

The next step is to heat the pipe to the correct temperature gradient prior to coating the pipe with the protective layer.

Direct flame impingement heating with additional and independent open flame end heaters is located at 6 o'clock providing energy at 150,000 KJ/m. Pipe rotation of 7-12 rev/min is used during this heat cycle which varies from 4-15 min and is dependent on the pipe mass. Temperature gradients are controlled such that 1-2 m of the pipe ends are held at 40° C.±5° C. above the pipe body temperature but not exceeding 400° C., at the time of discharge from the oven.

To balance the pipe end cooling effects, the pipe socket end 35 temperature should be held to 30° C.±5° C. above the pipe body temperature with a maximum of 345° C. when the pipe dipping operation commences.

For sound adhesion to be obtained, it is important that the above temperature controls and the following lower limits on dip temperature should be observed.

| | |
|---|---|
| 280° C. and | 10 mm wall thickness |
| 300° C. | 6 mm wall thickness |
| 320° C. | 5 mm wall thickness |
| 340° C. | 4.5 mm wall thickness |

Stabilising

The stabilizing process step follows in which the temperature of the socket and spigot ends are corrected to, and stabilized at, the required levels for accurate coating thickness application by the use of localized heating or cooling equipment as appropriate.

Pre-Coating

Prior to dipping the pipe into a coating bath, the external surface of the socket end 35 should be precoated to a thickness of 1 mm±0.25 mm using a method of application which prevents any excess oxidized powder from returning to the bath. This precoat provides a balance between internal and external deposition rates and ensures correct final coating thicknesses on both internal and external surfaces.

Coating

The coating process step, which is a time/temperature function, follows.

The pipe is rotated at 5-10 rev/min, while immersed to 30% of its diameter in the fluidised polyethylene bath, held at 25-60° C. Higher temperatures increase the rate of fusion onto the pipe. Immersion times vary between 1.5-4 minutes, which provides the necessary time to deposit coating thicknesses.

High socket temperatures require the separate pre-coating of the socket external surface prior to immersion to balance internal and external socket thicknesses and avoid oxidation of bath powders.

Where the pipe is to be fully polyethylene lined a measured quantity of powder is introduced into the inside of the pipe after the pipe has been lowered into the powder for external coating.

Some additional heat may be introduced during this process by the application of a full length induction heating coil. Subsequent post heating of the pipe ends may be required when the pipe wall thickness is 5 mm or below.

Cooling

Cooling of the pipe is the next step and is carried out by natural or fan assisted airflow which lowers the temperature from 200° C.±20° C. to 60° C. within a time limit of not less than 20 minutes.

Buffing

Beveling of the internal termination of the coating is required when another product, for example, a cement mortar lining is to be applied. Buffing beveling of the coating terminations at 1:3 tapers follows the cooling step.

Cement Mortar Lining

When required, a cement mortar lining can be applied to the inside surface of the pipe and overlaps the termination of the polyethylene at the ends so producing a continuous protection to the internal steel surface.

Elastomeric Rings

Elastomeric rings of a suitable type are utilized for the sealing means of the pipe joint.

The present invention therefore provides a method for producing a restrained joint that can be welded on-site without affecting the continuous internal corrosion barrier on the coated and lined pipes.

The invention claimed is:

1. A pipe joint between two metallic pipes which have been at least one of internally and externally coated with a material to prevent corrosion, comprising:
 a spigot terminating in an inverted hump supporting an elastomeric seal, the inverted hump being spaced from a protruding hump; and
 a socket adapted to fit over the spigot, the socket having an outwardly flared forward end terminating in an annular lip that engages an exterior of the protruding hump wherein the lip is welded to an exterior of the spigot.

2. The pipe joint according to claim 1 wherein a fillet weld is applied to the lip and the spigot.

3. The pipe joint according to either claim 1 wherein a hole is positioned in the lip before the weld to test for leakage.

4. The pipe joint according to claim 1 wherein a closed and sealed hole is positioned in the lip before the weld.

5. The pipe joint according to claim 1 wherein the coating is removed from the forward end of the socket and the protruding hump of the spigot.

6. The pipe joint according to claim 1 wherein an area where the lip is welded is externally coated with shrink sleeving.

7. The pipe joint according to claim 1 wherein a joint entry is between approximately 100 mm and 140 mm.

8. The pipe joint according to claim 1 wherein an outer diameter of the protruding hump is approximately 5.5 mm radially larger than a nominal outer diameter for a pipe body.

* * * * *